United States Patent [19]

Melanson

[11] Patent Number: 5,356,590
[45] Date of Patent: Oct. 18, 1994

[54] METHOD OF MOULDING AN ATTACHMENT STRUCTURE TO A MOULDED PART

[75] Inventor: Paul Melanson, Tecumseh, Canada

[73] Assignee: Tooling Technology Centre Inc., Windsor, Canada

[21] Appl. No.: 983,496

[22] Filed: Nov. 30, 1992

[30] Foreign Application Priority Data

Aug. 4, 1992 [CA] Canada ................... 2075330

[51] Int. Cl.$^5$ .................... B29C 33/42; B29C 33/44; B29C 45/44
[52] U.S. Cl. ................... 264/328.1; 264/334; 425/438
[58] Field of Search ............... 264/328, 274, 275, 242, 264/334; 425/438

[56] References Cited

U.S. PATENT DOCUMENTS

| | | | |
|---|---|---|---|
| 3,206,801 | 9/1965 | Costa et al. | 264/242 |
| 3,314,644 | 4/1967 | Dwyer et al. | 264/242 |
| 4,264,661 | 4/1981 | Brandolf | 264/328.1 |
| 4,569,865 | 2/1986 | Placek | 264/328.1 |
| 4,649,010 | 3/1987 | Bennett et al. | 264/242 |

Primary Examiner—Jan H. Silbaugh
Assistant Examiner—Angela Ortiz
Attorney, Agent, or Firm—Jeffrey T. Imai; Arne T. Fors; Doak Horne

[57] ABSTRACT

A method of manufacturing a moulded part using a first and second mould, wherein the first mould has a complementary design of the outer surface of the moulded part and the second mould has a complementary design of the inner surface of the moulded part and a boss cavity for forming an outer wall of a thin-walled boss to be moulded onto the inner face of the moulded part. The steps include seating a plug substantially co-planar with the complementary inner surface design and extending the plug into the boss cavity presenting an inner wall of the boss, wherein the thickness between the inner and outer wall of the boss is less than 60% of the thickness of the moulded part where the boss is moulded thereto. Closing the first and second mould forming a mould cavity. Injecting molten material into the mould cavity. Waiting a predetermined amount of time to allow the molten material to harden. Opening the first and second moulds. Extending the plug from the boss cavity. Removing the moulded part from the first and second mould.

3 Claims, 4 Drawing Sheets

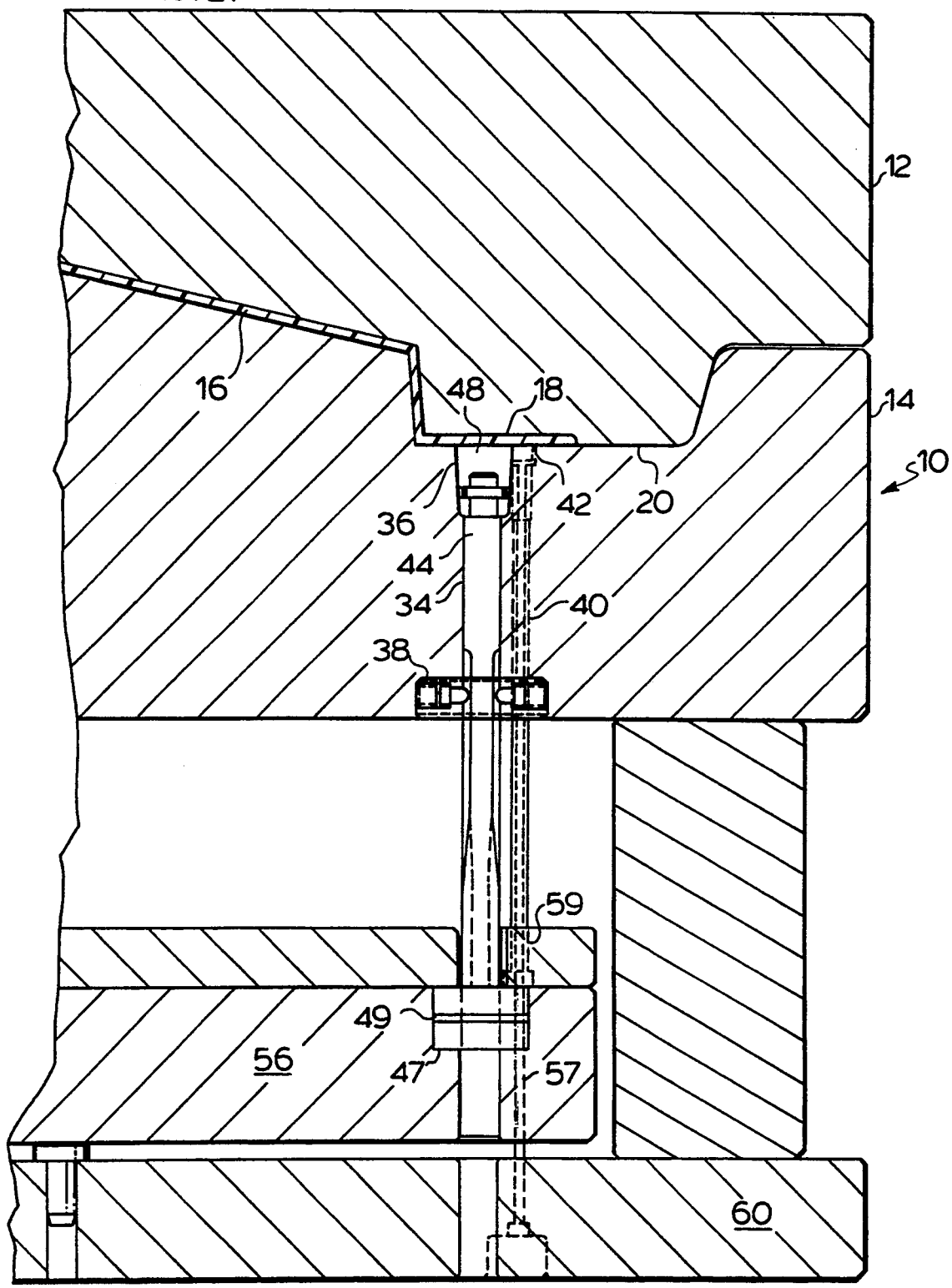

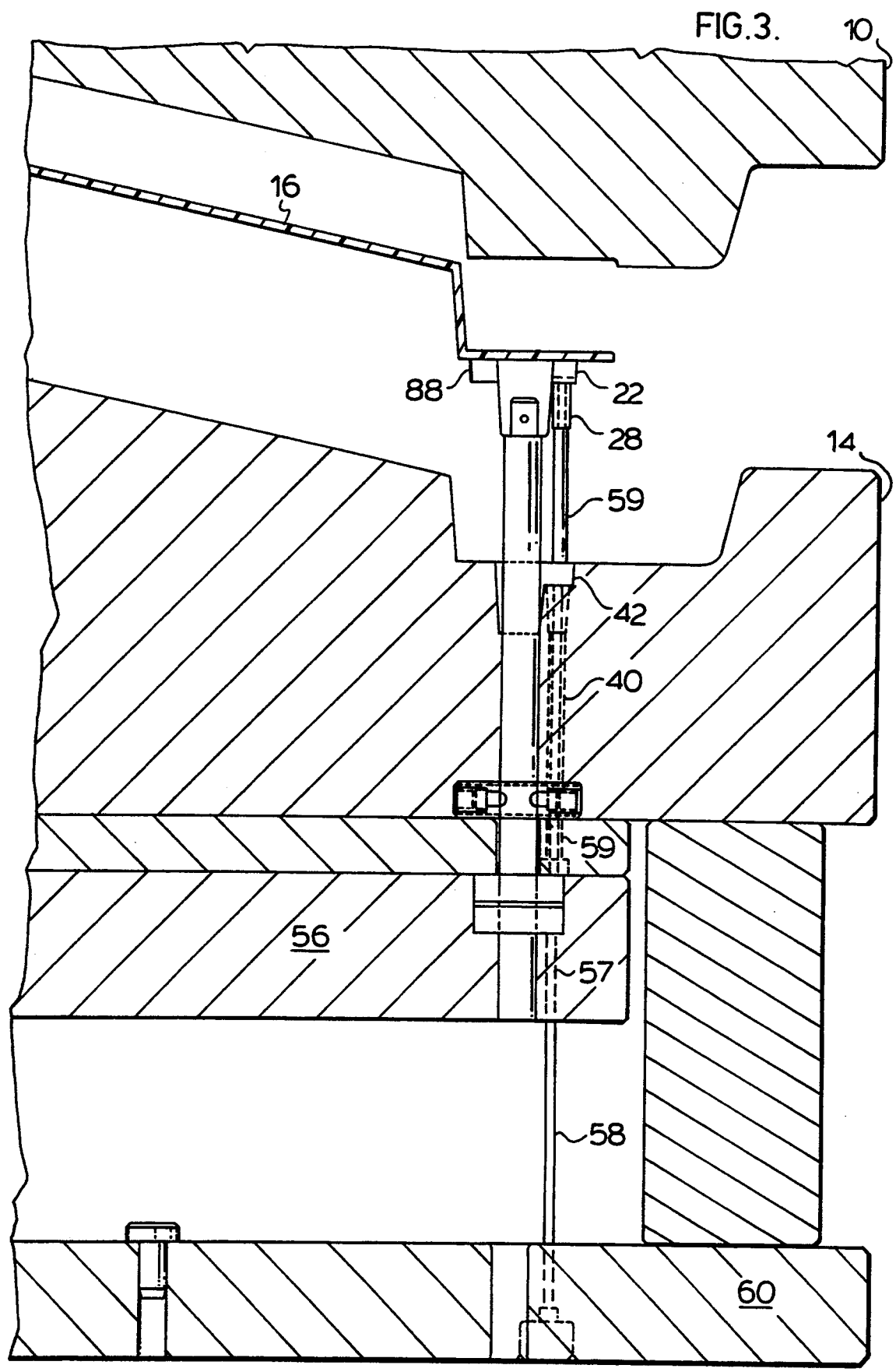

METHOD OF MOULDING AN ATTACHMENT STRUCTURE TO A MOULDED PART

FIELD OF INVENTION

This invention relates to an improved method of moulding an attachment structure to a moulded part. In particular, this invention relates to a method of moulding a thin-walled boss to the rear face of a moulded part.

BACKGROUND OF INVENTION

In the automotive industry, many parts for the vehicles are manufactured using a moulding process. The moulding process is particularly well suited for high volume production of parts.

In particular, injection moulding has been used extensively to manufacture various parts. A mould is manufactured in at least two parts such that when put together, a cavity is formed which is filled with a molten plastic or metal material which hardens to the desired shape and size of a finished product.

In order to reduce the size and weight of many moulded parts, the part is designed to have a relatively thin shell. However, in order for the part to be attached in the desired location, special attachments must be provided to receive screws to fasten the part at the desired location. A boss is normally moulded directly to the part from which connectors can be moulded to receive screws for fastening the part to the desired location.

It is a well-known rule in the art of moulding that the thickness of an attachment on the rear face of a part cannot exceed 60% of the thickness of the shell to which the attachment is moulded. If the thickness of the boss exceeds 60%, a "sink hole" will be formed on the outer shell of the moulded part. The sink hole results from the shell cooling and shrinking at a different rate than where the boss attaches thereto. The presence of a sink hole in the finished part is highly undesirable and can result in rejection of the part by the manufacturer and the consumer.

The different rates of cooling of the solid boss and the thinner shell portion cause a further problem. If a high rate of production is used, the moulded part is removed from the mould when the solid boss portion is still hardening. Unless the part is maintained in a position where the connecting tube extends vertically, the connecting tube will have a tendency to sag as the boss hardens. This process will cause the connecting tube to become misaligned resulting in a high rate of rejection during assembly of the part.

SUMMARY OF THE INVENTION

The disadvantages of the prior art may be overcome by providing a method of moulding a thin-walled boss to the rear face of a moulded part.

It is also desirable to have a method of manufacture to mould a thin-walled boss to the rear face of a moulded part while permitting the finished part to be freely removed from the mould.

According to one aspect of the invention, there is provided a method of manufacturing a moulded part using a first and second mould. The first mould includes a complementary design of the outer shell of a moulded part, while the second mould has a complementary design of the inner surface of the moulded part and a boss cavity for forming an outer wall of a thin-walled boss to be moulded onto the inner face of the moulded part. The method comprises the steps of:

seating a plug substantially co-planar with the complementary inner surface design and extending into the boss cavity presenting an inner wall for the boss, wherein the thickness between the inner and outer wall of said boss is less than 60% of the thickness of the moulded part where the boss is moulded thereto;

closing the first and second mould forming a mould cavity;

injecting molten material into the mould cavity;

waiting a predetermined amount of time to allow the molten material to harden;

opening said first and second moulds;

extending the plug from said boss cavity;

removing the moulded part from the first and second mould.

According to another aspect of the invention, the plug is mounted on a shaft extending through the second mould. The plug is rotatable and extendable from a first position within the boss cavity to a second position spaced from the second mould when said first and second mould are open permitting the moulded part to be freely removed therefrom.

DETAILED DESCRIPTION OF THE DRAWINGS

In drawings which illustrate embodiments of the invention,

FIG. 2 is a sectional view of the mould apparatus according to the invention, in a closed position;

FIG. 3 is a sectional view of the mould apparatus according to the invention, in an open position;

DETAILED DESCRIPTION OF THE INVENTION

Figure 1:
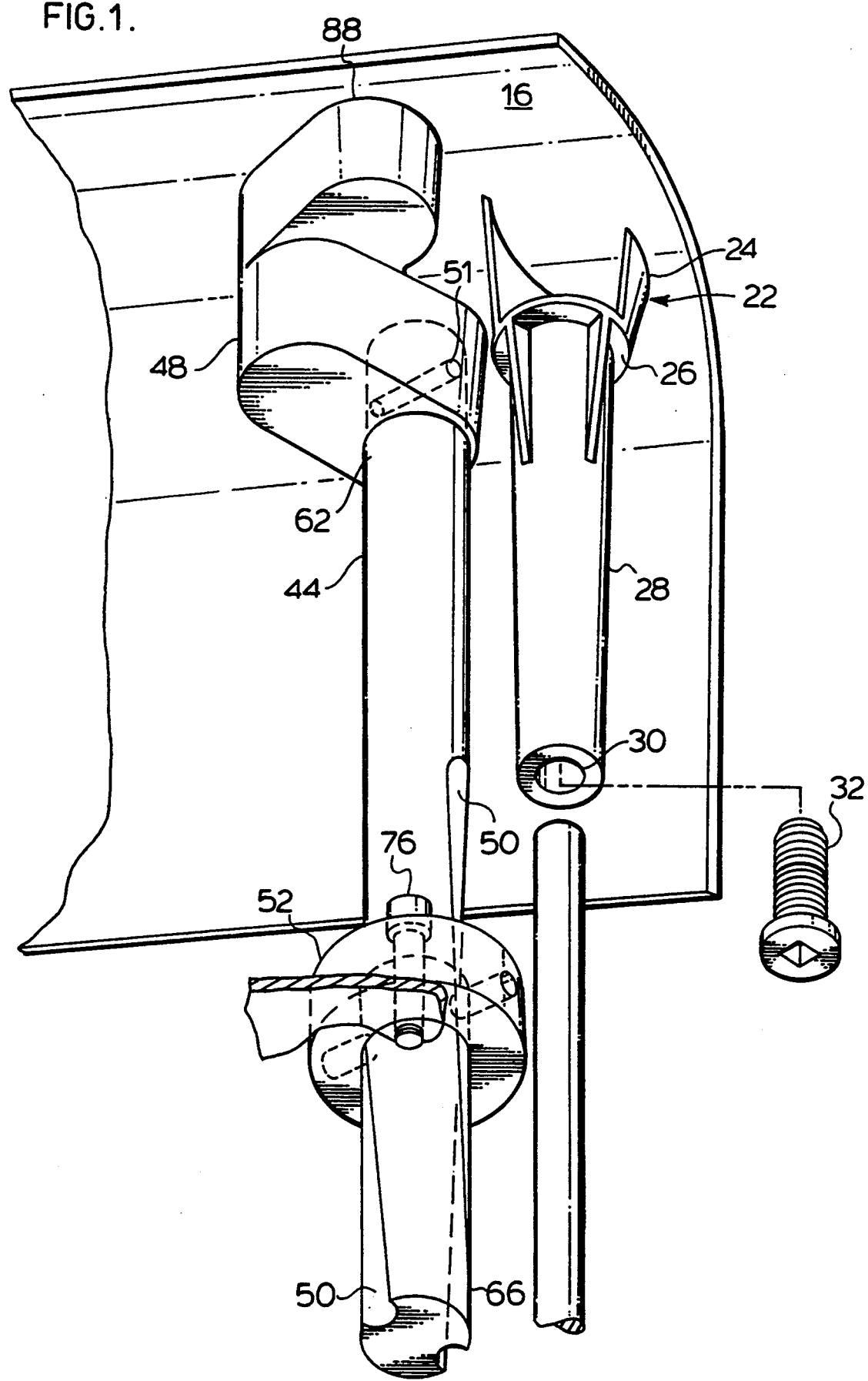
FIG. 1 is perspective view of a thin-walled boss manufactured according to the present invention and the plug and cam lifter according to the present invention.

The thin-walled boss which is being formed by the present invention is best illustrated in FIG. 1. The boss 22 will extend from the inner face of part 16. The boss will have an arcuate wall 24 having a very slight taper or angle with respect to the inner surface of part 16. Platform 26 will extend across walls 24. Extending from platform 26 is tube 28 having an aperture 30 extending therethrough and adapted to receive screw 32 to mount the part 16 at the desired location.

The present invention is more clearly described with respect to the mould apparatus 10 illustrated in FIG. 2. The moulding apparatus 10 comprises a first mould 12 and a second mould 14 which are adapted to open and close by moving towards and away from each other respectively. Hydraulic or pneumatic means (not illustrated) are used to open and close the moulds.

Mould 12 is generally the female mould having the complimentary design 18 of the outer shell of moulded part 16 on one face thereof. Mould 14 has the complimentary design 20 of the inner face of moulded part 16.

When in a closed position, moulds 12 and 14 will present a mould cavity substantially in the desired shape of moulded part 16.

In order to mould a thin-walled boss, mould 14 is provided with an bore 34 extending through mould 14 immediately adjacent to where boss 22 is desired to be moulded onto part 16. At the inside surface of mould 14, at the end of bore 34, is plug cavity 36. Plug cavity 36 has slightly tapered walls and rounded corners. At the opposite end of bore 34 is counter-bore 38.

Connecting rod 44 is slidably mounted within bore 34. Plug 48 is mounted at one end of connecting rod 44 by pin 51. Connecting rod 44 is provided with grooves 50 extending longitudinally thereof.

Mounted within counter-bore 38 is actuator puck 52 having projections 54 for extending into grooves 50 of connecting rod 44. Connecting rod 44 is mounted on ejector plate 56 in bearing 47 mounted in a recess. Bearing 47 is attached to rod 44 by a slip ring 49.

Ejector plate 56 is adapted to move relative to mould 14. Hydraulic or pneumatic means (not illustrated) effect the relative movement. Mould 14 is stationary with respect to base plate 60.

Mould 14 is also provided with bore 40. The diameter of bore 40 corresponds to the desired diameter of tube 28 of part 16. At the end of bore 40 on the inner face of mould 14, boss cavity 42 communicates with one end of plug cavity 36. The shape of boss cavity 42 is complimentary to the shape of the outside wall 24 of boss 22.

Also extending from ejector plate 56 is ejector tube 59. Ejector tube 59 has a central longitudinally extending bore. Ejector tube 59 extends substantially parallel to connecting rod 44 and substantially concentric with bore 40. Ejector tube 59 extends into bore 40 and acts as the end moulding surface of connector 28 to be formed.

Ejector plate 56 has a bore 57 through which, rod 58 extends. Rod 58 is substantially the same diameter as the inner diameter of ejector tube 59. Rod 58 is mounted to base plate 60 and will extend through ejector tube 59 into bore 40 and terminates prior to boss cavity 42. Rod 58 will create aperture 30 of tube 28.

Referring now to FIG. 1, connecting rod 44 is illustrated in greater detail. For reasons which will become apparent, connecting rod 44 has grooves 50 extending longitudinally in an offset pattern. Although the preferred embodiment illustrates a groove 50 on each side of connecting rod 44, a single groove would be adequate to achieve the desired results.

Figure 5:
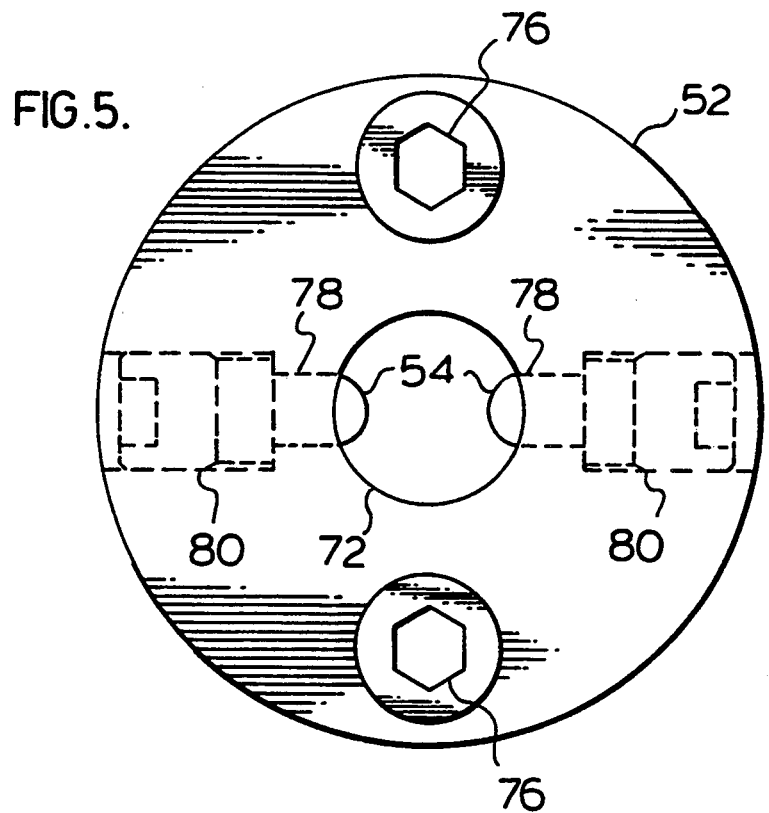
FIG. 5 is a top plan view of the actuator puck of the apparatus of FIG. 2.
Figure 6:
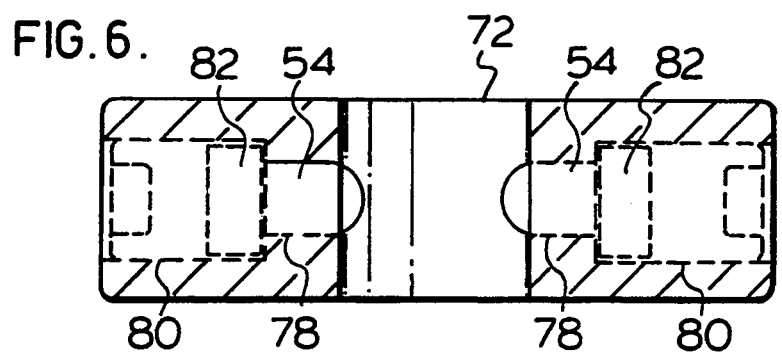
FIG. 6 is a side sectional view of the actuator puck of the apparatus of FIG. 2.
Figure 4:
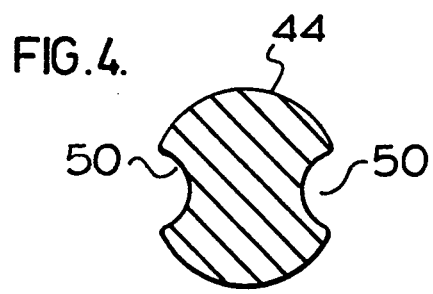
FIG. 4 is a cross sectional view of the connecting rod of the cam lifter of FIG. 1.

Referring now to FIG. 5, actuator puck 52 is illustrated. Puck 52 has an axially extending central bore 72 and two offset axially extending bores adapted to receive bolts 76 for mounting the puck 52 in counter-bore 38. The diameter of central bore 72 is substantially the same as the diameter of bore 34 of mould 14.

Extending radially of central bore 72 are inner bores 78 and counter-bores 80. Projection 54 is seated within each of bores 78 and is biased to extend into bore 72. Projection 54 has a base 82 for sliding engagement with counter-bore 80.

End 66 of connecting rod 44 is presented to puck 52 such that projections 54 slidingly engage with grooves 50. As connecting rod 44 travels past puck 52, projections 54 will travel along groove 50. As a result of the shape of groove 50, connecting rod 44 will rotate relative to puck 52 as it travels along.

Referring now to FIG. 1, plug 48 is illustrated in greater detail. Plug 48 has a counter-bore adapted to frictionally receive connecting rod 44. Pin 51 secures plug 48 onto the end of connecting rod 44.

The upper portion of plug 48 has an L-shape. The toe portion 88 of the L-shape, corresponds to the inside surface of wall 24 of boss 22 to be formed. The lower portion of plug 48 is configured to be snugly seated within plug cavity 36 of mould 14.

In operation, ejector plate 56 will be in a retracted position as illustrated in FIG. 2. Plug 48 will be snugly seated within plug cavity 36 of mould 14. Toe portion 88 will extend into boss cavity 42. Mould 12 is closed relative to mould 14 presenting a mould cavity in which moulded part 16 will be formed. A space will exist between toe portion 88 and boss cavity 42 to form the boss 22. A channel will also be presented for the formation of connection tube 28.

Molten material, preferably plastic, is injected into the cavity until it is filled. The molten material is allowed to cool until sufficiently hardened to permit handling thereof. After a predetermined waiting time, the mould is opened by moving mould 12 away from mould 14. Due to the configuration of the boss 22, part 16 will not readily fall away from mould 14. Ejector plate 56 will move forwardly relative to mould 14 advancing connecting rod 44 to move forwardly and urge part 16 away from mould 14. At the same time, ejector tube 59 will extend into bore 40 of mould 14 urging the material formed as connecting tube 28 out of bore 40. Connecting rod 44 will move relative to projections 54 of actuator puck 52, causing connecting rod 44 to rotate such that toe portion 88 of plug 48 rotates out of boss 22. After toe portion 88 rotates, part 16 may be freely removed from the mould apparatus.

Once the part 16 has been removed from the moulding apparatus, ejector plate 56 is returned to a stand-by position, causing connecting rod 44 to move relative to actuator puck 52 rotating plug 48 permitting it to become snugly seated within plug cavity 36. Mould 12 is closed again presenting a mould cavity. The process is repeated until the desired number of parts have been manufactured.

It is apparent from the above disclosure that any number of bosses 22 and connecting tubes 28 may be moulded onto the inner space of part 16. Like devices are ganged onto the ejector plate 15 to operate in unison.

Further, it is apparent to those skilled in the art that the moulding surface where boss 22 is moulded to the inner face of part 16 does not necessarily have to be arcuate as illustrated in FIG. 3. The inner face of part 16 can be of any contour provided that there is sufficient room for plug 48 to rotate.

It is also apparent that the shape of the grooves 50 directly relate to the rotational movement of plug 48. Plug 48 may be rotated in any manner to facilitate the ejection of the part 16 from the mould.

I claim:

1. A method of manufacturing a moulded part having an inner surface, an outer surface and an attachment structure moulded to said inner surface, said attachment structure comprising a thin-walled boss having an arcuate wall and a platform extending thereacross, said platform spaced from said inner surface, said method utilizing a first mould having a complementary design of the outer surface of said moulded part and a second mould having a complementary design of the inner surface of said moulded part, said second mold having a boss cavity presenting an outer wall surface for moulding an outer face of the arcuate wall and a base for moulding the platform, said method comprising the steps of:

seating an L-shaped plug within said boss cavity until substantially co-planar with said complementary design of the inner surface, said L-shaped plug having a toe portion for moulding an inner face of the arcuate wall and the platform of said thin-walled boss, wherein the distance between the toe portion and the outer wall surface does not exceed 60% of the thickness of the moulded part where the thin-walled boss is to be moulded;

relatively moving said first and second mould together closing a mould cavity complementary to said moulded part and communicating with said boss cavity;

injecting molten material into said mould cavity and boss cavity;

waiting a predetermined amount of time to allow said molten material to harden forming said moulded part;

opening said mould cavity by relatively moving said first and second moulds apart;

extending said L-shaped plug from said boss cavity while urging the moulded part from said second mould, rotating said plug for rotating said toe portion from between the platform of said thin-walled boss and said inner surface of the moulded part, freeing said thin-walled boss from said L-shaped plug; and removing said moulded part from said first and second mould.

2. A method as claimed in claim 1 wherein said L-shaped plug is mounted on a shaft extending through said second mould and said L-shaped plug is rotatable and extendable from a first position within said boss cavity to a second position spaced from said second mould when said first and second moulds are apart permitting the moulded part to be freely removed therefrom.

3. A method as claimed in claim 2 wherein said attachment structure includes a tube and said second mould includes a bore communicating with said boss cavity, said method further including the steps of prior to injecting said molten material, inserting a rod concentrically within said bore, while the L-shaped plug is being extended and rotated, urging an ejector tube concentrically mounted about said rod towards said first mould for ejecting the tube of the moulded part from the second mould.

* * * * *